United States Patent
Jung et al.

(10) Patent No.: US 11,951,930 B2
(45) Date of Patent: Apr. 9, 2024

(54) DIFFUSOR FOR A GAS GENERATOR, GAS GENERATOR WITH SUCH DIFFUSOR AND MANUFACTURING METHOD FOR SUCH DIFFUSOR

(71) Applicant: ZF Airbag Germany GmbH, Aschau a. Inn (DE)

(72) Inventors: Christian Jung, Mühldorf (DE); Thomas Kapfelsperger, Mühldorf (DE); Bernd Weber, Erharting (DE); Michael Schmökel, Burghausen (DE)

(73) Assignee: ZF Airbag Germany GmnH, Aschau a. Inn (DE)

( * ) Notice: Subject to any disclaimer, the term of this patent is extended or adjusted under 35 U.S.C. 154(b) by 143 days.

(21) Appl. No.: 17/639,182

(22) PCT Filed: Jul. 29, 2020

(86) PCT No.: PCT/EP2020/071395
§ 371 (c)(1),
(2) Date: Feb. 28, 2022

(87) PCT Pub. No.: WO2021/037469
PCT Pub. Date: Mar. 4, 2021

(65) Prior Publication Data
US 2022/0324410 A1    Oct. 13, 2022

(30) Foreign Application Priority Data
Aug. 27, 2019    (DE) .......................... 102019122987.1

(51) Int. Cl.
*B60R 21/261*    (2011.01)
*B60R 21/217*    (2011.01)
(Continued)

(52) U.S. Cl.
CPC ........ *B60R 21/261* (2013.01); *B60R 21/2171* (2013.01); *B60R 21/26* (2013.01);
(Continued)

(58) Field of Classification Search
CPC .............. B60R 21/217; B60R 21/2171; B60R 21/26; B60R 21/261; B60R 21/262;
(Continued)

(56) References Cited

U.S. PATENT DOCUMENTS

| | | | | |
|---|---|---|---|---|
| 4,021,058 A | * | 5/1977 | Suzuki | ................... B60R 21/261 137/71 |
| 4,084,839 A | * | 4/1978 | Takagi | .................... B60R 21/26 280/736 |

(Continued)

FOREIGN PATENT DOCUMENTS

| | | | | |
|---|---|---|---|---|
| DE | 20003652 U1 | * | 4/2000 | ............. B60R 21/30 |
| DE | 29917943 U1 |   | 3/2001 | |

(Continued)

OTHER PUBLICATIONS

International Search Report and Written Opinion for PCT/EP2020/071395 dated Sep. 21, 2020 (13 pages; with English translation).

*Primary Examiner* — Barry Gooden, Jr.
(74) *Attorney, Agent, or Firm* — Kristin L. Murphy

(57) ABSTRACT

The disclosure relates to a diffusor for a gas generator of an airbag module, comprising a substantially tubular base body with a longitudinal axis, a baffle cap axially connected to the base body at a first end of the diffusor and a connecting device configured at a second end of the diffusor opposite to the first end. At least one outflow opening is formed in an outer wall of the tubular base body such that gas can flow out of an interior of the diffusor substantially in parallel to a longitudinal axis in the direction of the first end and the second end from the diffusor. The baffle cap is free from an (Continued)

outflow opening. The disclosure further relates to a gas generator comprising such a diffusor, as well as an airbag module including such a gas generator. Moreover, a method for manufacturing the diffusor is also proved.

17 Claims, 12 Drawing Sheets

(51) Int. Cl.
  *B60R 21/26* (2011.01)
  *B60R 21/262* (2011.01)
(52) U.S. Cl.
  CPC .................. *B60R 21/262* (2013.01); *B60R 2021/26076* (2013.01); *B60R 2021/2612* (2013.01)
(58) Field of Classification Search
  CPC ............... B60R 2021/2612; B60R 2021/2615; B60R 2021/2617
  See application file for complete search history.

(56) References Cited

U.S. PATENT DOCUMENTS

| | | | | |
|---|---|---|---|---|
| 5,611,566 A * | 3/1997 | Simon | ................ | B60R 21/2644 280/736 |
| 5,658,008 A * | 8/1997 | Herrmann | ............. | B60R 21/217 280/728.2 |
| 5,988,677 A * | 11/1999 | Adomeit | ............... | B60R 21/261 280/736 |
| 6,022,043 A * | 2/2000 | Harnisch | ............... | B60R 21/205 280/732 |
| 6,109,649 A * | 8/2000 | Adomeit | ............... | B60R 21/233 280/740 |
| 6,325,409 B1 * | 12/2001 | Fischer | ................. | B60R 21/213 280/730.2 |
| 6,328,332 B1 * | 12/2001 | Schutz | .................. | B60R 21/217 280/741 |
| 6,474,680 B1 * | 11/2002 | Miyahara | .............. | B60R 21/213 280/736 |
| 7,644,950 B2 * | 1/2010 | Kloss | .................... | B60R 21/261 280/740 |
| 8,573,644 B1 | 11/2013 | Mayville et al. | | |
| 2002/0008373 A1 * | 1/2002 | Specht | ................. | B60R 21/213 280/741 |
| 2002/0105175 A1 * | 8/2002 | Lewis | ..................... | B60R 21/18 280/733 |
| 2003/0001371 A1 * | 1/2003 | Wackenroder | .......... | B60R 21/26 280/742 |
| 2003/0094798 A1 * | 5/2003 | Ogata | ..................... | B60R 21/26 280/730.2 |
| 2003/0111832 A1 * | 6/2003 | Kelley | .................. | B60R 21/261 280/736 |
| 2003/0178829 A1 * | 9/2003 | Dinsdale | ............... | B60R 21/232 280/741 |
| 2004/0026910 A1 * | 2/2004 | Englbrecht | ............. | B01J 4/001 280/736 |
| 2004/0140655 A1 * | 7/2004 | Henning | ................ | B60R 21/26 280/736 |
| 2004/0232664 A1 * | 11/2004 | Tokunaga | ............... | B60R 21/26 280/730.2 |
| 2004/0232675 A1 * | 11/2004 | Marotzke | ............. | B60R 21/276 280/739 |
| 2005/0062272 A1 * | 3/2005 | Smith | ..................... | B60R 21/26 280/741 |
| 2005/0121883 A1 * | 6/2005 | Joos | ...................... | B60R 21/201 280/728.2 |
| 2005/0156419 A1 * | 7/2005 | Gabler | ................. | B60R 21/261 280/740 |
| 2005/0161927 A1 * | 7/2005 | Yokoyama | ........ | B60R 21/23138 280/743.1 |
| 2005/0189739 A1 * | 9/2005 | DePottey | .............. | B60R 21/261 280/740 |
| 2005/0248134 A1 * | 11/2005 | Heigl | .................... | B60R 21/261 280/730.2 |
| 2006/0103119 A1 * | 5/2006 | Kurimoto | ............. | B60R 21/233 280/730.2 |
| 2006/0261582 A1 * | 11/2006 | Fischer | ................. | B60R 21/261 280/736 |
| 2007/0063489 A1 * | 3/2007 | Dinsdale | ............... | B60R 21/261 280/728.2 |
| 2007/0200327 A1 * | 8/2007 | Kloss | .................... | B60R 21/261 280/740 |
| 2007/0262573 A1 * | 11/2007 | Faeth | ...................... | B62D 1/16 280/736 |
| 2008/0054610 A1 * | 3/2008 | Heigl | .................... | B60R 21/261 280/736 |
| 2008/0136154 A1 * | 6/2008 | Lindqvist | ................ | B60R 21/26 280/741 |
| 2011/0316264 A1 * | 12/2011 | Maruyama | .......... | B60R 21/2171 280/730.2 |
| 2012/0248747 A1 * | 10/2012 | Sugimoto | ............. | B60R 21/207 280/729 |
| 2013/0048460 A1 | 2/2013 | Keller et al. | | |
| 2013/0048760 A1 * | 2/2013 | Iwakiri | ............... | B60R 21/2171 239/569 |
| 2013/0161946 A1 * | 6/2013 | Baumgartner | ...... | B60R 21/2171 285/402 |
| 2017/0036640 A1 * | 2/2017 | Tonooka | .............. | B60R 21/2171 |
| 2018/0141514 A1 | 5/2018 | Last et al. | | |
| 2019/0143927 A1 * | 5/2019 | Casal Alonso | ..... | B60R 21/2037 280/731 |
| 2021/0009075 A1 * | 1/2021 | Schoenborn | ........ | B01D 46/2403 |
| 2022/0001826 A1 * | 1/2022 | Disam | ................... | B60R 21/262 |
| 2022/0266788 A1 * | 8/2022 | Weber | ................... | B60R 21/261 |
| 2022/0274557 A1 * | 9/2022 | Disam | ................... | B60R 21/261 |
| 2022/0332273 A1 * | 10/2022 | Fischer | ............... | B60R 21/2171 |

FOREIGN PATENT DOCUMENTS

| | | | | |
|---|---|---|---|---|
| DE | 19957578 A1 * | 5/2001 | ........ | B60R 21/2171 |
| DE | 10318133 A1 | 10/2003 | | |
| DE | 10222085 A1 * | 12/2003 | ............. | B60R 21/26 |
| DE | 10236905 A1 * | 2/2004 | ............. | B60R 21/26 |
| DE | 10358057 A1 * | 7/2004 | ............. | B60R 21/26 |
| DE | 102004005555 A1 * | 9/2005 | ............. | B60R 21/26 |
| DE | 102005024846 A1 | 11/2006 | | |
| DE | 102006048525 A1 * | 5/2007 | ............ | B60R 21/217 |
| DE | 102006041611 A1 | 3/2008 | | |
| DE | 102008029903 A1 * | 12/2009 | ............. | B60R 21/26 |
| DE | 102008063789 A1 | 7/2010 | | |
| DE | 112009004386 T5 | 5/2012 | | |
| DE | 112009004386 B4 | 2/2016 | | |
| DE | 102017100858 A1 | 7/2018 | | |
| DE | 102019100262 A1 | 4/2020 | | |
| DE | 102020115988 A1 * | 1/2021 | ......... | B01D 46/0039 |
| EP | 1167130 A1 * | 1/2002 | ............. | B60R 21/26 |
| EP | 1544060 A1 | 6/2005 | | |
| EP | 1775178 A2 * | 4/2007 | ......... | B60N 2/42763 |
| GB | 2399548 A * | 9/2004 | ............. | B60R 21/26 |
| GB | 2406312 A | 3/2005 | | |
| JP | H10181514 A | 7/1998 | | |
| JP | 2003127821 A | 5/2003 | | |
| WO | WO-03078215 A1 * | 9/2003 | ......... | B60R 21/26 |
| WO | WO-2004045922 A1 * | 6/2004 | ............. | B60R 21/26 |

* cited by examiner

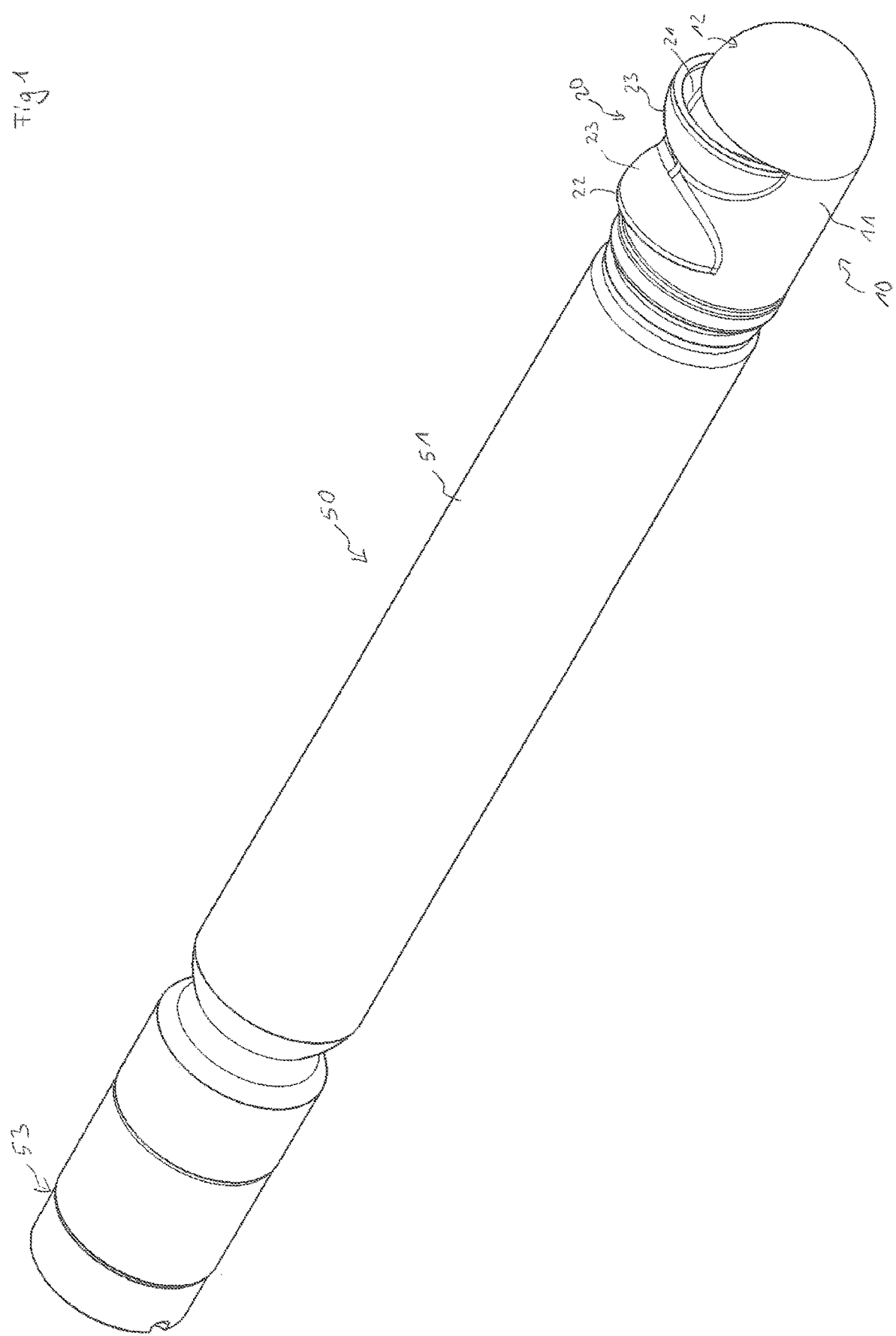

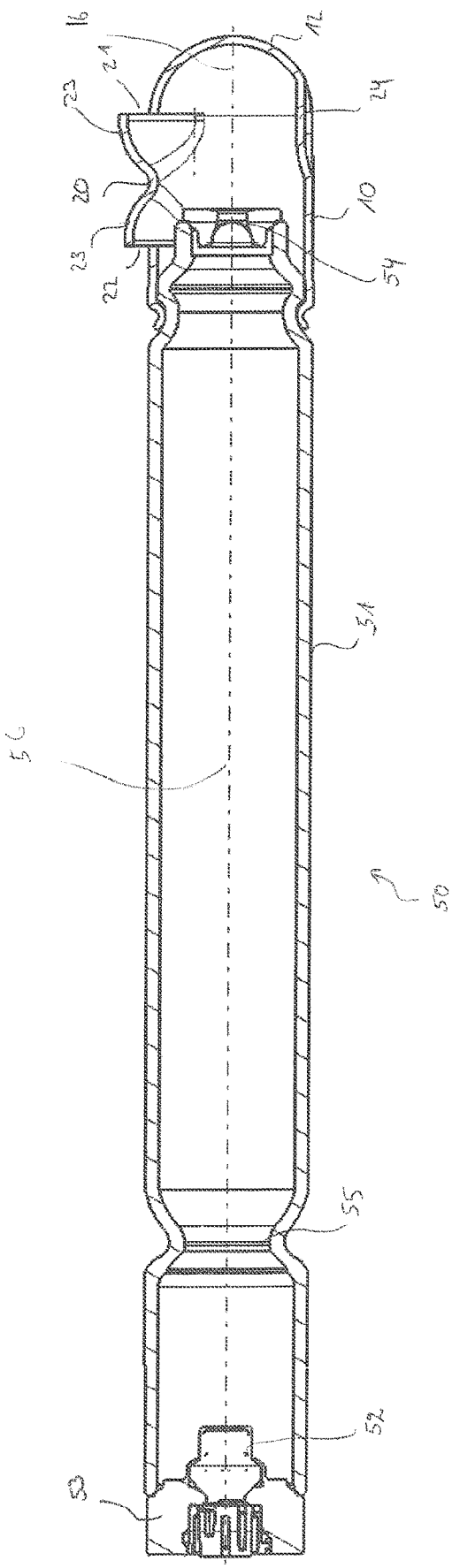

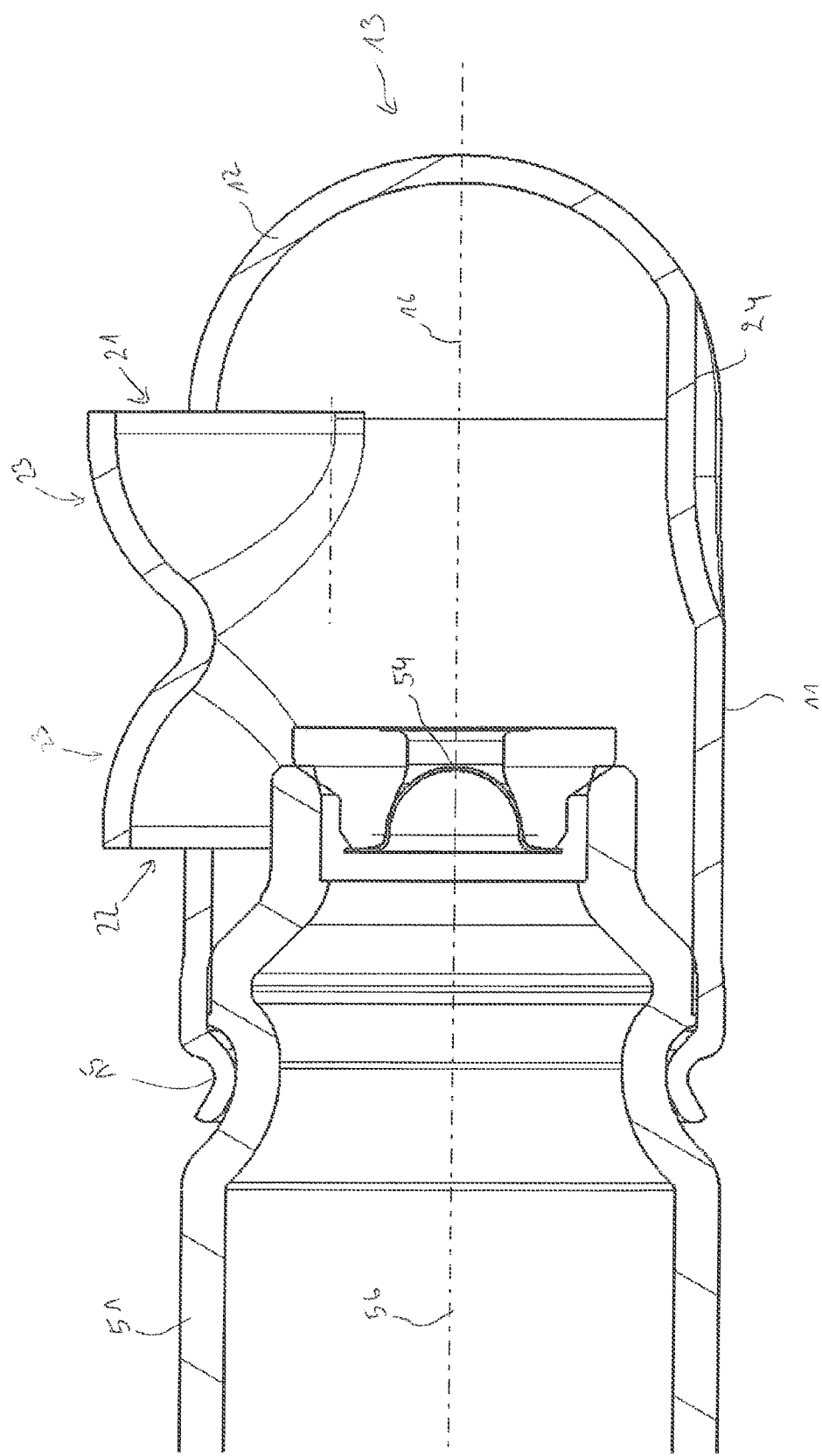

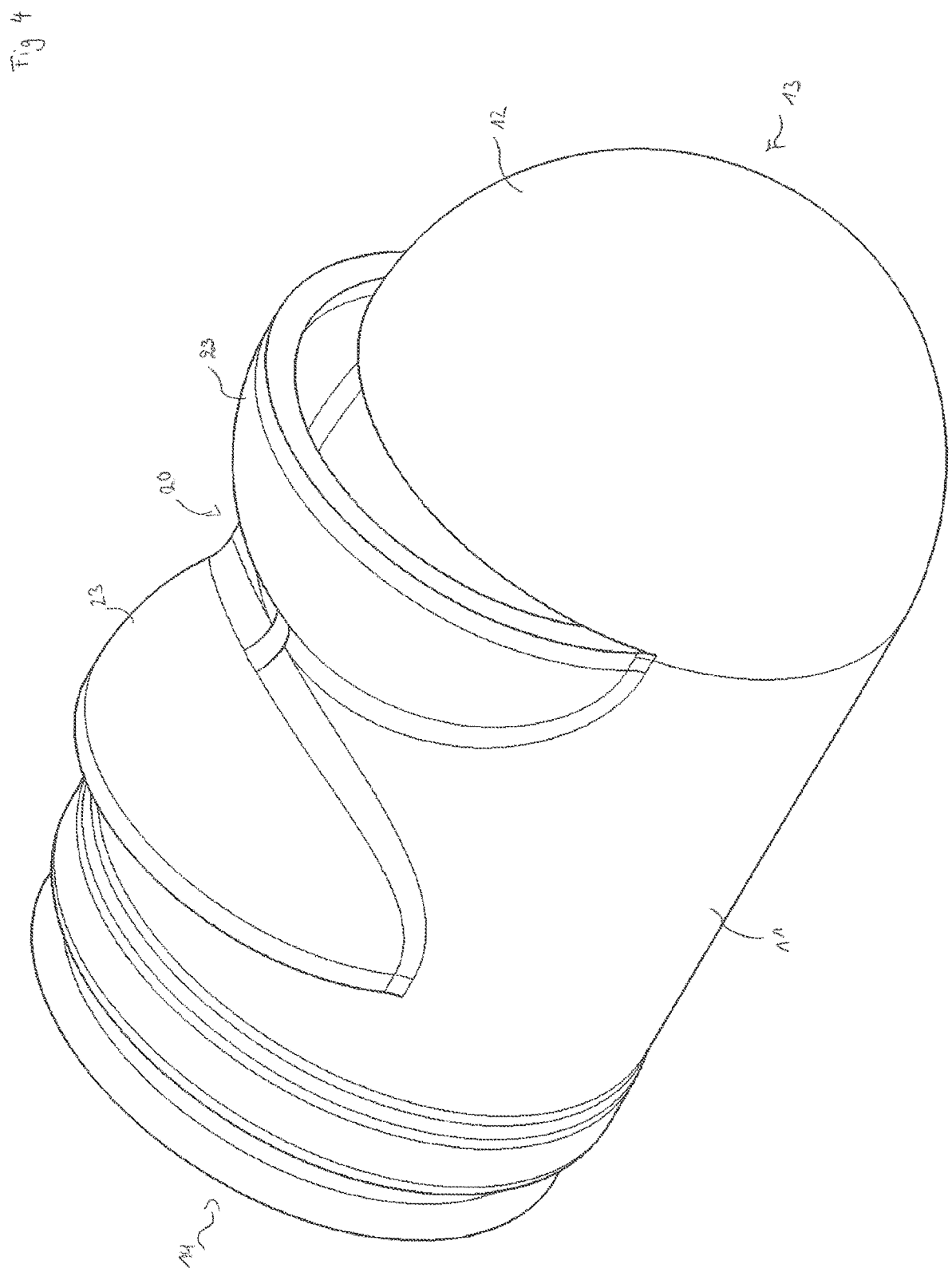

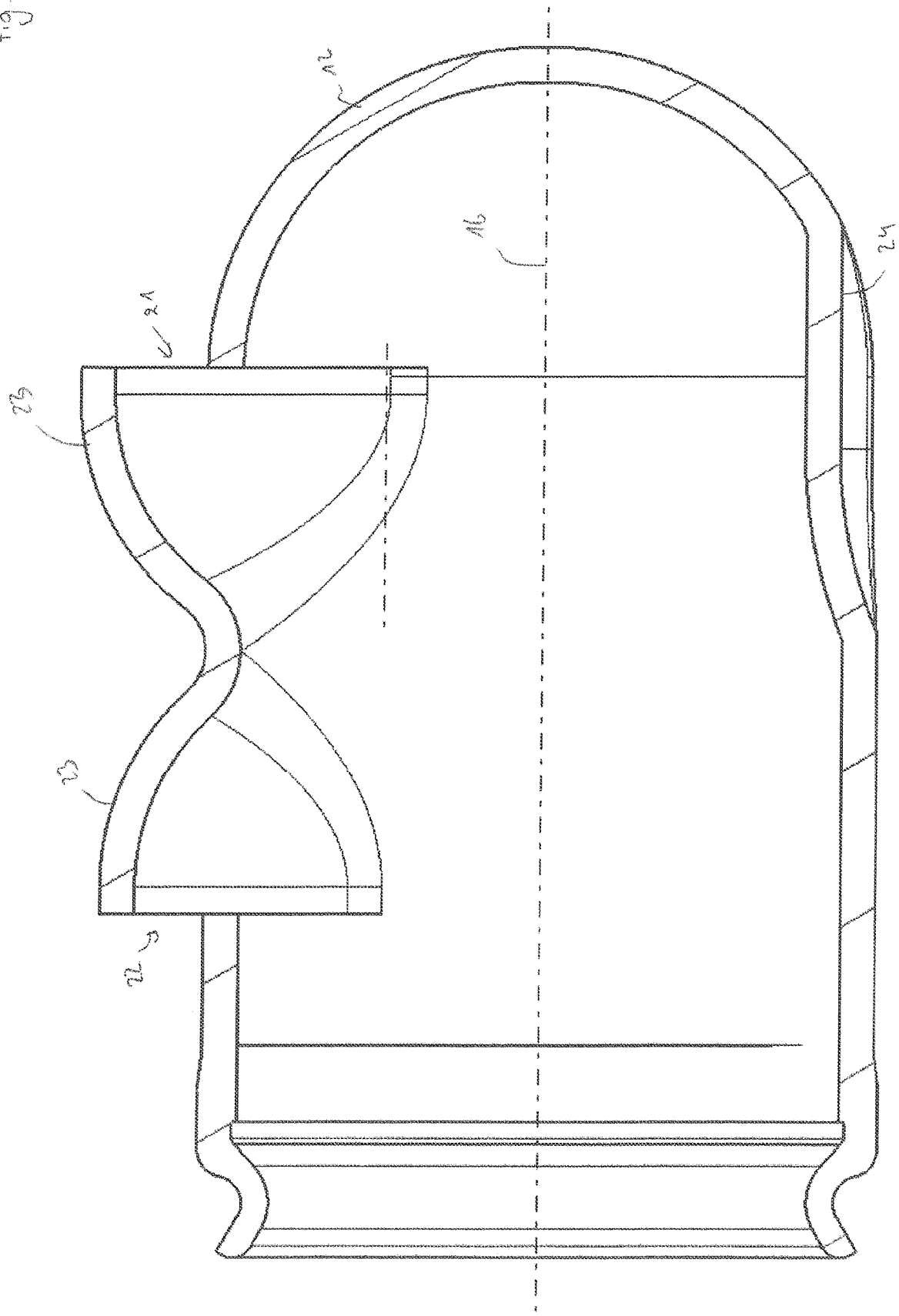

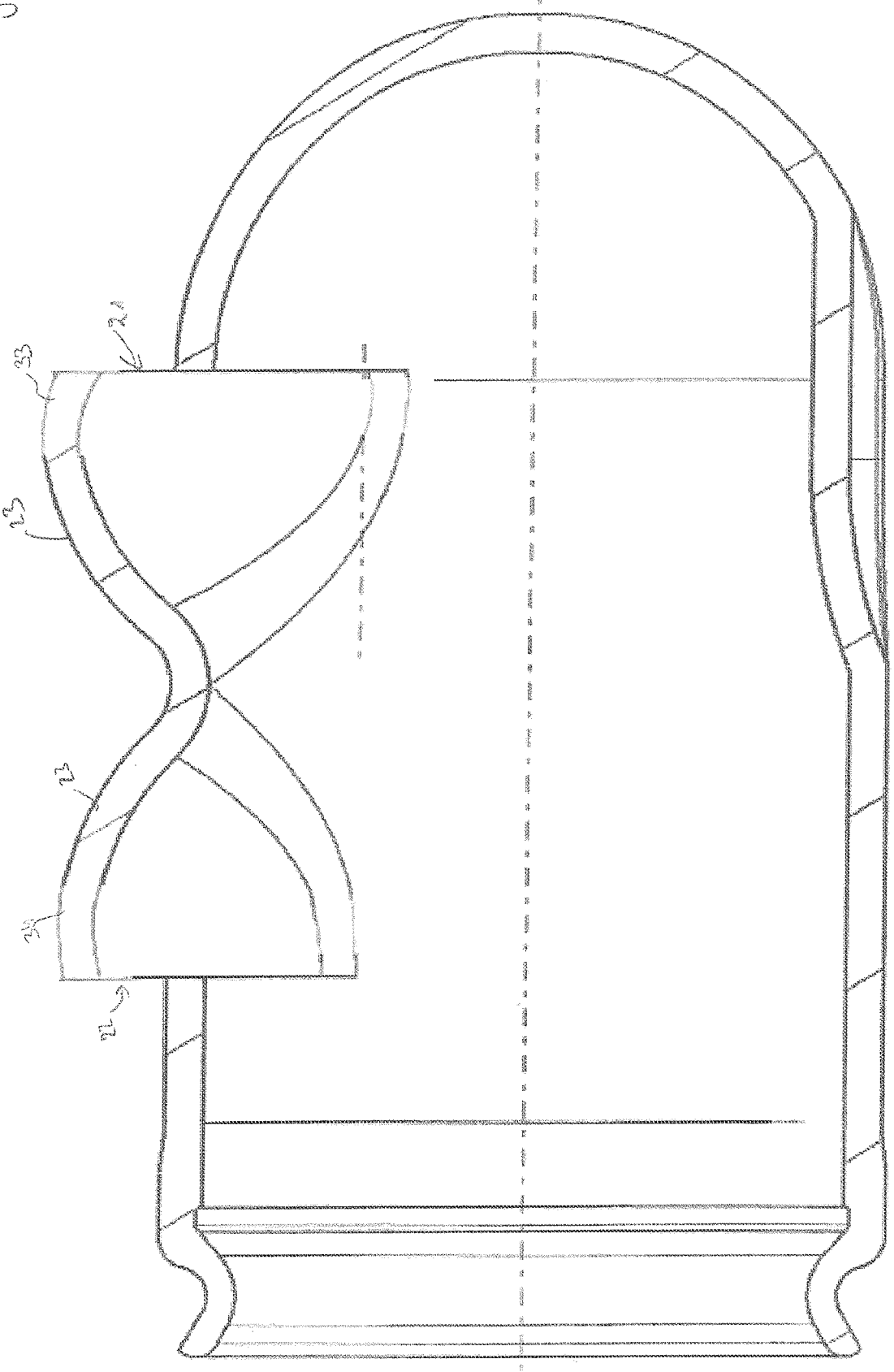

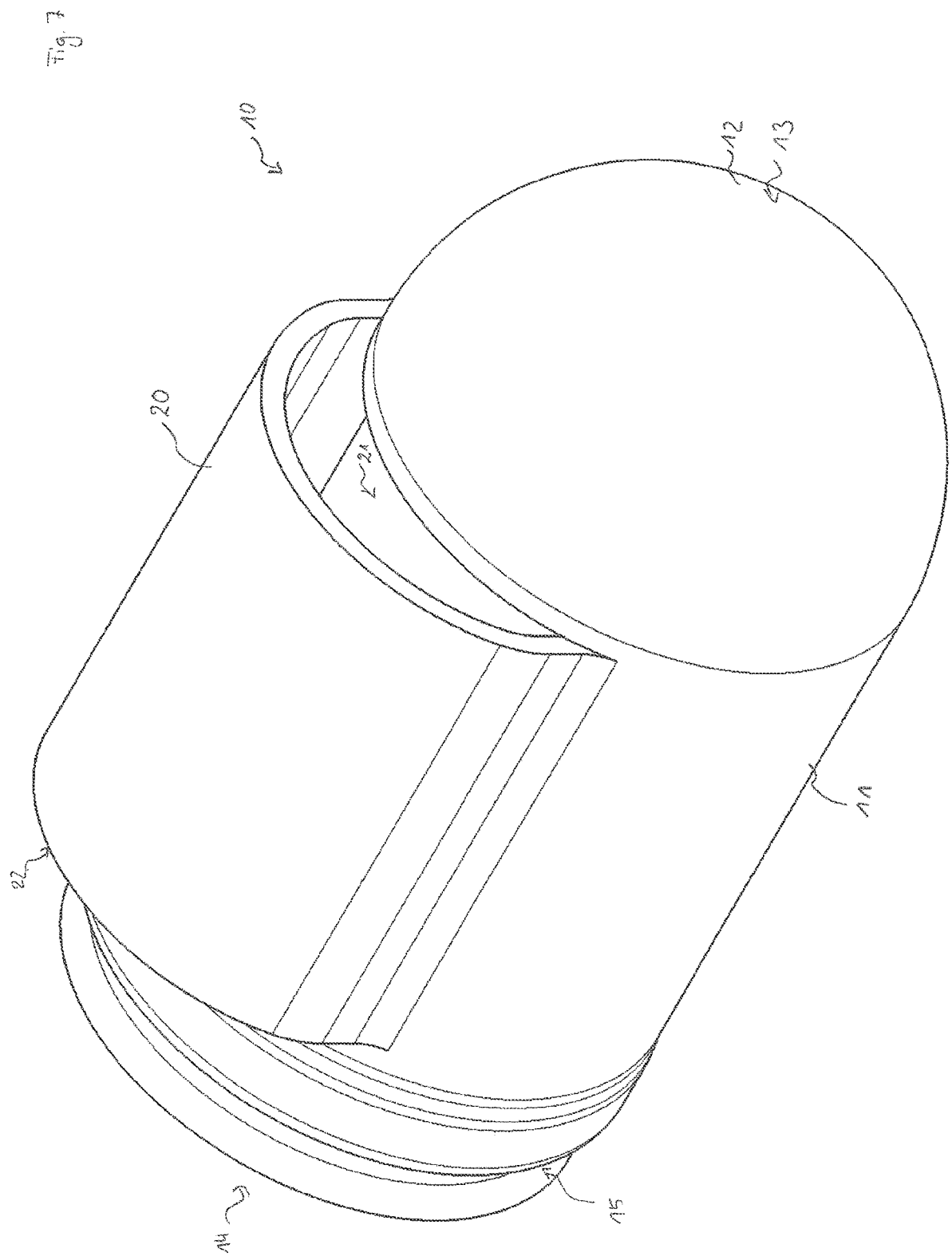

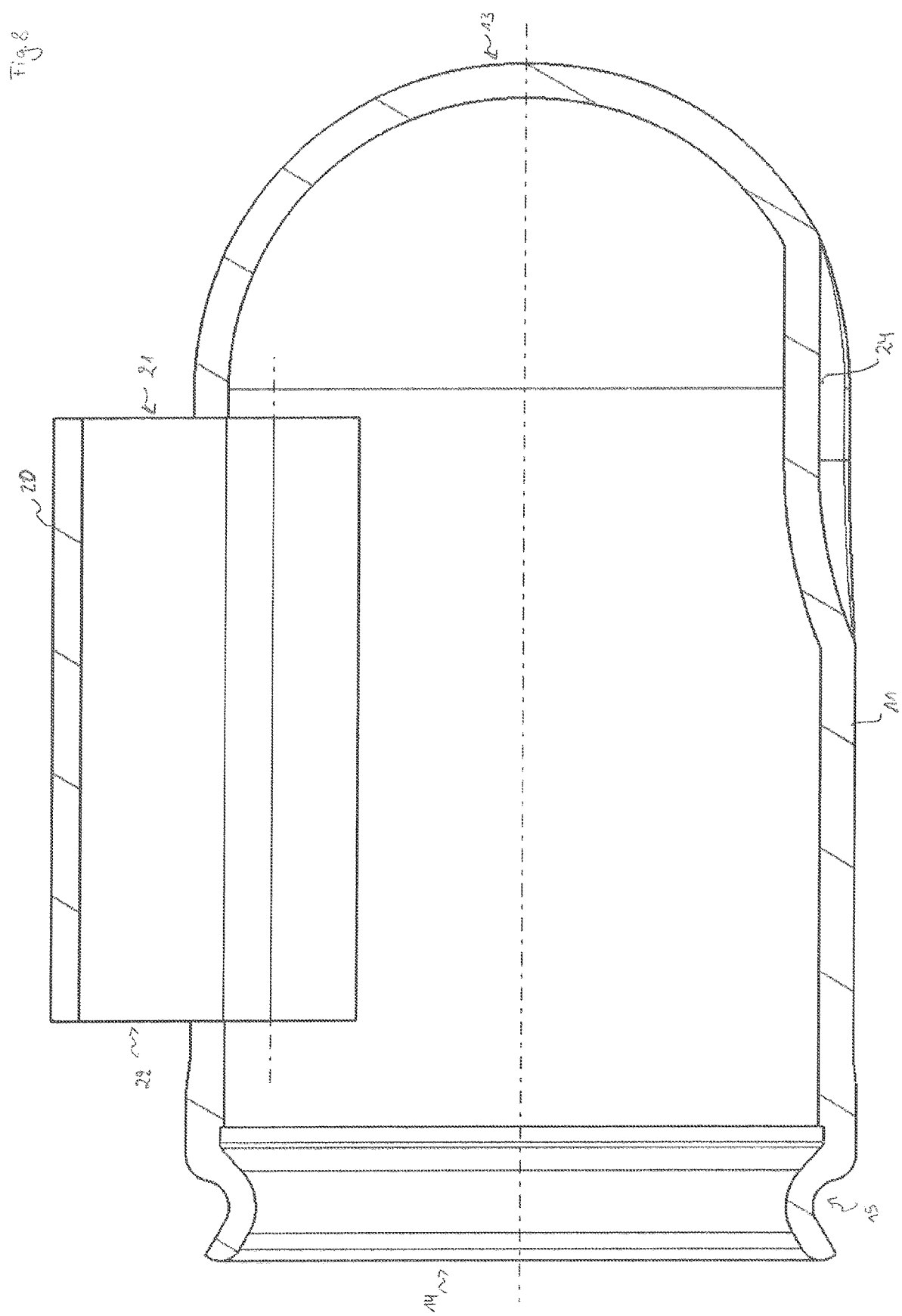

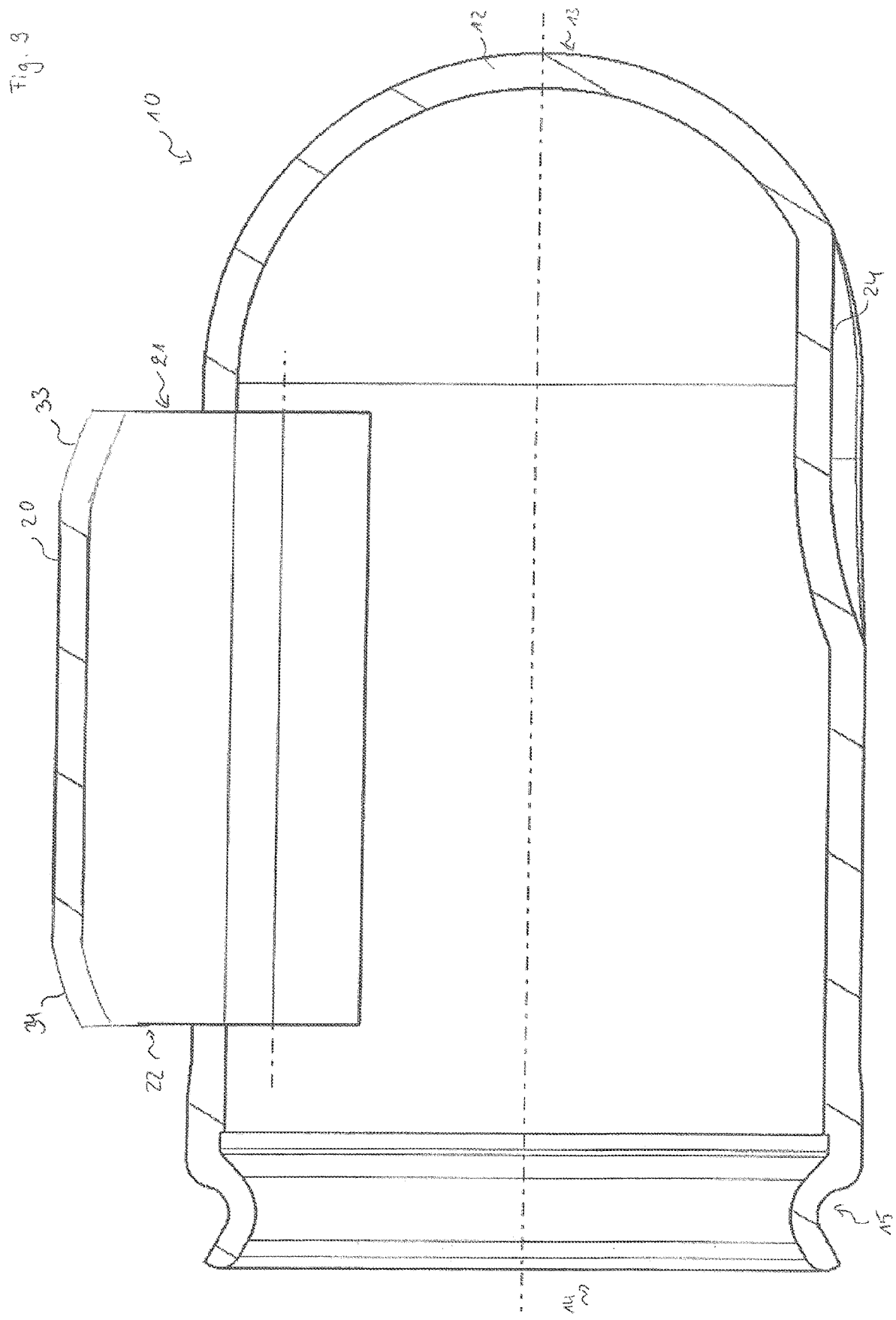

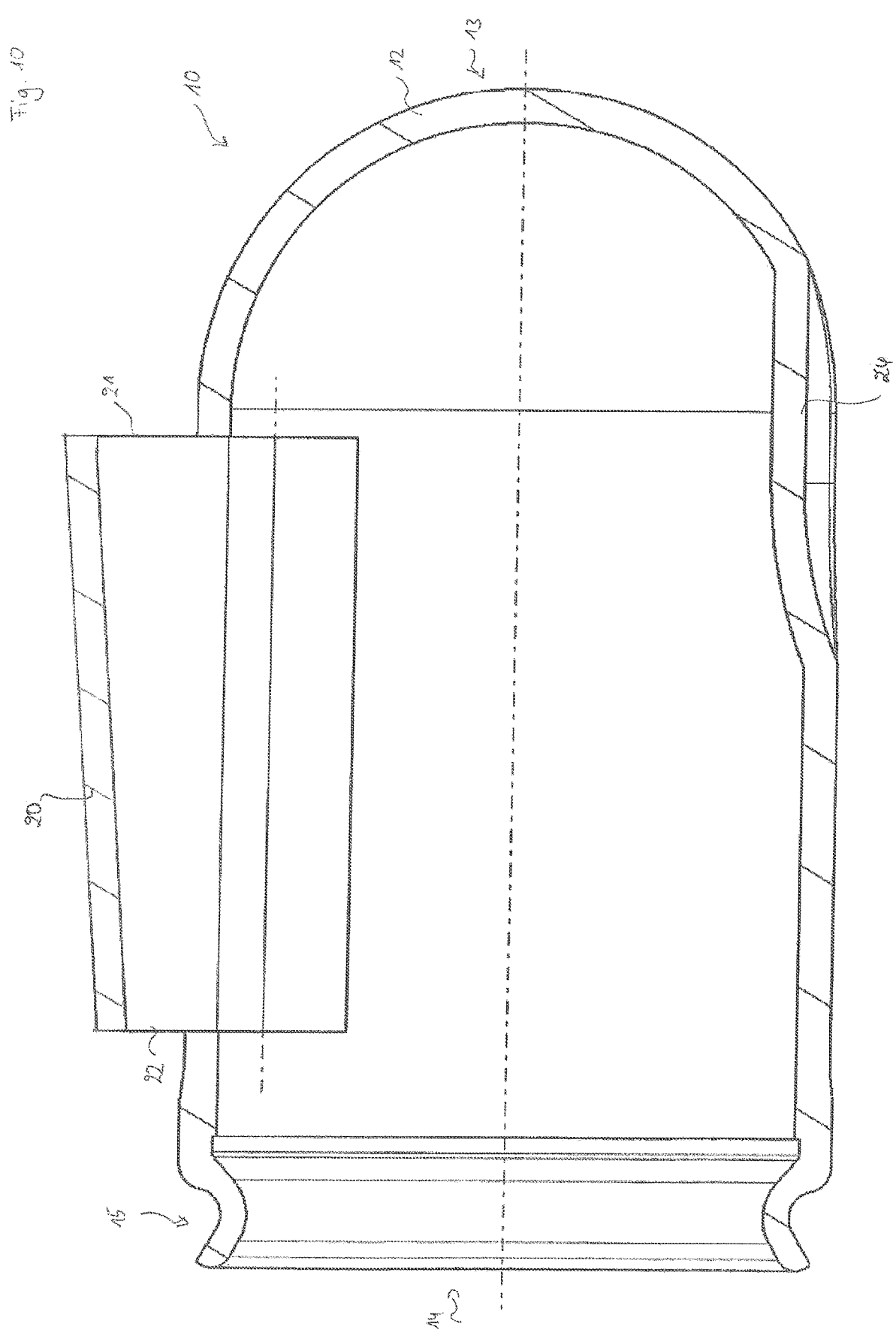

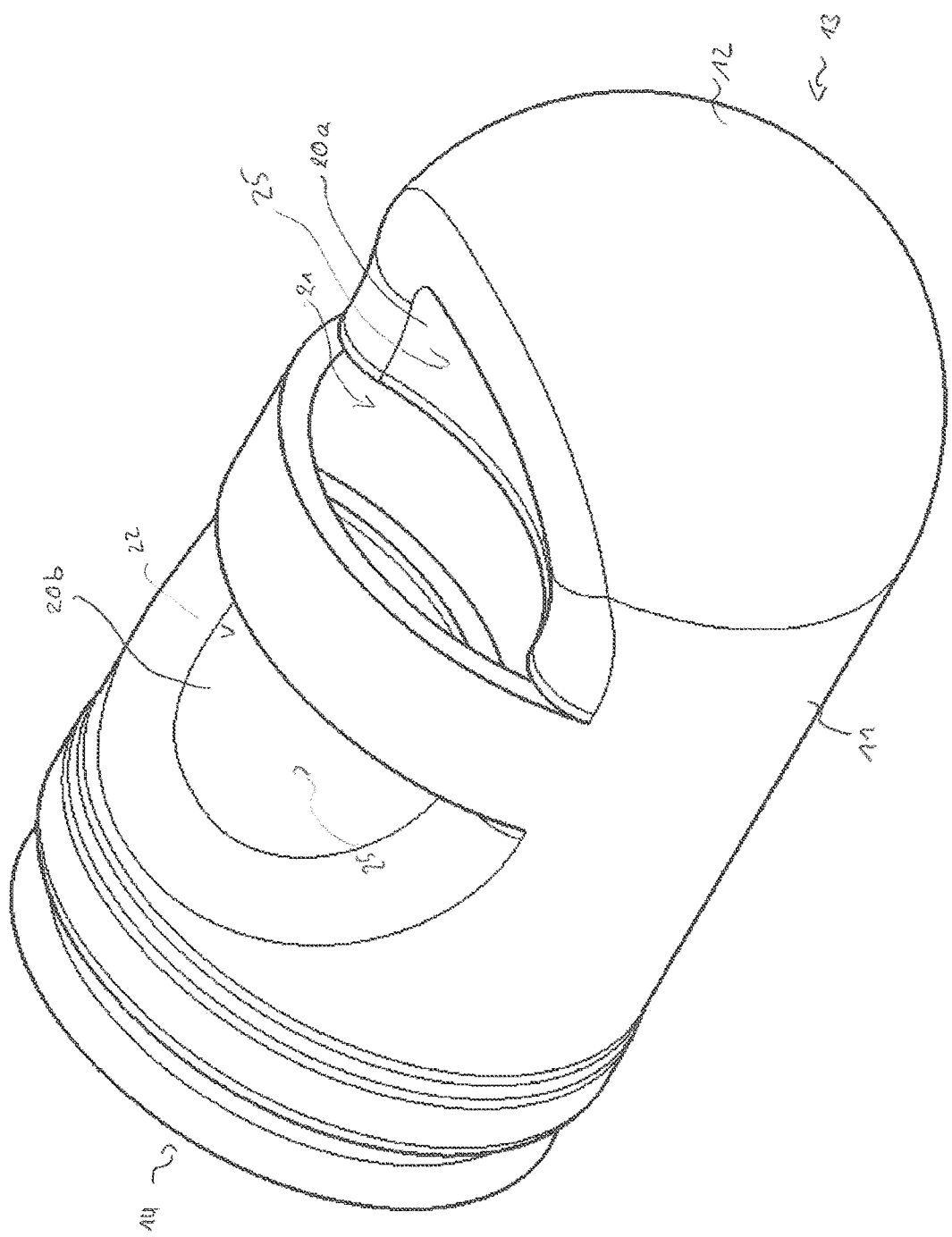

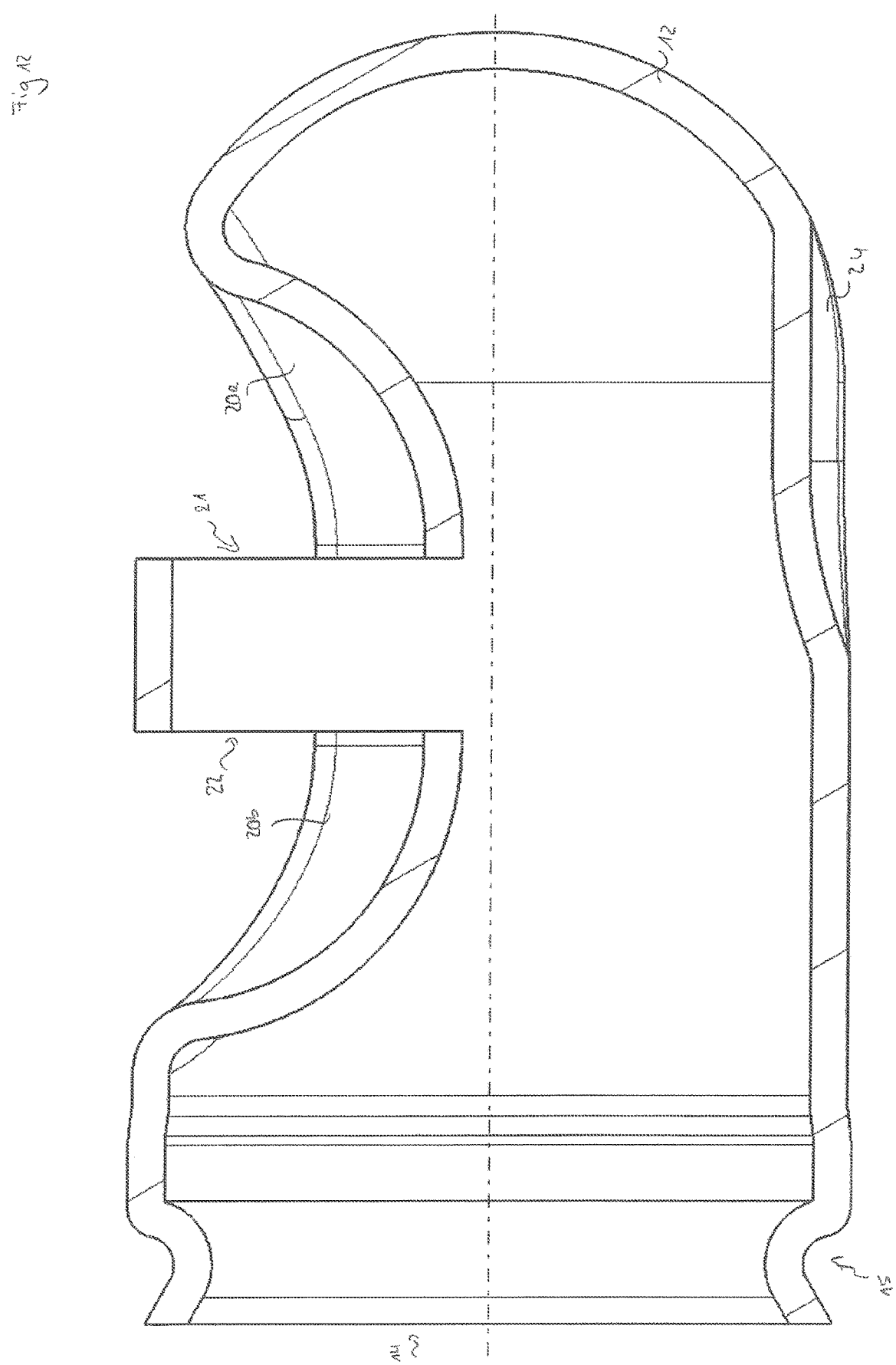

DIFFUSOR FOR A GAS GENERATOR, GAS GENERATOR WITH SUCH DIFFUSOR AND MANUFACTURING METHOD FOR SUCH DIFFUSOR

CROSS-REFERENCE TO RELATED APPLICATIONS

This application is a national stage of International Application No. PCT/EP2020/071395, filed Jul. 29, 2020, the disclosure of which is incorporated herein by reference in its entirety, and which claimed priority to German Patent Application No. 102019122987.1, filed Aug. 27, 2019, the disclosure of which is incorporated herein by reference in its entirety.

TECHNICAL FIELD

The disclosure relates to a diffusor for a gas generator, as well as to a gas generator comprising a diffusor of this kind. Moreover, the disclosure deals with an airbag module that includes a gas generator. Also, the disclosure shows a method for manufacturing the diffusor.

BACKGROUND

A diffusor is known from EP 1 544 060 A1. The known diffusor comprises a substantially tubular base body having a longitudinal axis, a baffle cap axially connected to the base body at a first end of the diffusor and a connecting device formed at a second end of the diffusor opposite to the first end. The known diffusor has radial openings in its tubular base body through which gas may flow out of the interior of the diffusor exclusively substantially in the radial direction, i.e., substantially perpendicularly to the longitudinal axis of the tubular base body of the diffusor.

A diffusor has the function to introduce gas generated and/or stored in a gas generator to an airbag connected to the diffusor or positioned following the latter. The known diffusor has a drawback in that an airbag, which is usually relatively close to the radial openings of the diffusor, is relatively heavily loaded by the gas flowing out of the diffusor exclusively in a radial direction, in particular regarding increased temperature and/or gas flow pressure and, resp., spreading of the gas pressure. Consequently, in this case a thermal and/or mechanical load of an airbag connected to the known diffusor and to be filled with gas is relatively high.

Furthermore, from U.S. Pat. No. 7,928,443 B1 a gas generator is known which on an end-side, a baffle cap includes, on the one hand, a central gas outlet in a longitudinal direction of the gas generator and has, on the other hand, plural radial outflow openings in a form of gas guide flaps that allow a gas to flow out at an acute angle with the longitudinal direction of the gas generator. In this way, on the whole, a shearing compensation or shearing neutrality during outflow is to be achieved. Also, when an airbag is filled by this gas generator, the airbag is heavily mechanically and/or thermally loaded in the longitudinal direction of the gas generator, in particular by a central gas outlet. For preventing or reducing heavy load of the airbag, expensive and complex airbag designs such as heat-resistant coatings of the interior of the airbag, for example, or use of a so-called calzone are possible. Such a calzone is a shield of heat and particle resistant fabric which is disposed either at a gas outflow opening of the gas generator or as an internal bag inside the airbag. Such a design is cost-intensive and complicated. In addition, frequently a gas flow in the longitudinal direction of the gas generator at a front-side end of the gas generator, as it is the case with the gas generator known here, is undesired and has to be avoided, as at a small distance therefrom there are provided further component parts such as a module housing in which the gas generator is installed. In this case, too, an adverse thermal and/or mechanical load due to gas axially flowing out of the end-side baffle cap of the gas generator is detrimental.

SUMMARY

Against this backdrop, what is needed is a diffusor for a gas generator that allows improved gas guidance so that an airbag is prevented from being heavily loaded. What is also needed is a gas generator comprising a diffusor of this kind. Moreover, what is also needed is an airbag module and a vehicle safety system comprising a gas generator as well as a method for manufacturing a diffusor for the gas generator.

In accordance with the disclosure, a diffusor is proposed. In addition, a gas generator employing a diffuser is also proposed. An airbag module is also disclosed, as well as a vehicle safety system. Further, a manufacturing method is also disclosed.

The diffusor according to the disclosure for a gas generator comprises—a substantially tubular base body with a longitudinal axis, a baffle cap axially connected to the base body at a first end of the diffusor, and a connecting device formed at a second end of the diffusor opposite to the first end. At least one outflow opening is formed in an outer wall of the tubular base body so that gas can flow out of an interior of the diffusor substantially in parallel to the longitudinal axis toward the first and second ends out of the diffusor, with the baffle cap being free from an outflow opening. By a tubular base body, it is to be understood that the base body has a substantially cylindrical outer contour. Further, by the term that "the baffle cap is axially connected to the base" it is to be understood that the baffle cap is adjacent, in the axial direction and, thus, along and, resp., in parallel to the longitudinal axis of the base body, to the latter either as an additional component part or formed integrally with the base body.

By substantially in parallel to the longitudinal axis, it is to be understood that a central flow direction of the gas extends in parallel to or at an acute angle of less than 45° with the longitudinal axis of the base body of the diffusor.

One exemplary advantage of the disclosure resides in the fact that the gas cannot flow out of the area of the baffle cap to an airbag or a module housing located in the vicinity of the baffle cap. In particular, when the baffle cap of the diffusor includes an axial end side of the diffusor or of a gas generator including such diffusor, further component parts positioned close to the baffle cap such as an airbag or a module housing are not impaired by thermal and/or mechanical loads. On the other hand, advantageously the gas is not guided directly against an airbag but along a folded airbag. By deflection of the main flow of the gas inside the diffusor by the baffle cap, the main flow is additionally reduced. Thus, the diffusor according to the disclosure can help dispense with the use of a calzone already described in the foregoing, for example. Moreover, the diffusor according to the disclosure is inexpensive as it can be realized in a simple manner. A peripheral pipe clamp outside the diffusor that deflects the flow would incur higher manufacturing costs.

In particular, in the diffusor according to the disclosure the at least one outflow opening is configured as a first outflow opening and as a second outflow opening, and the baffle cap is configured in one exemplary arrangement as dome-shaped, for example, as a ball segment or a universal ball joint. For this purpose, the outflow openings are usefully formed in such a way that a surface area of the outflow openings has a surface normal which extends in parallel to the longitudinal axis. A diffusor according to the disclosure of this type also enables two airbags to be inflated separately from each other to be filled simultaneously via the first and second outflow openings.

In one exemplary arrangement, the first outflow opening and the second outflow opening are formed by one single tab that is formed by two parallel notches extending perpendicularly to the longitudinal axis in the outer wall of the tubular base body and by deforming the area therebetween in a radially outward direction. Such a tab may have a flat or a curved surface. Accordingly, as a notch in accordance with the disclosure it is meant that a cut or a corresponding material abrasion is made along or across the entire thickness of the outer wall of the base body, e.g., by cutting, sawing, milling or laser abrasion so as to produce an appropriate notch that extends radially along a particular area of the base body. The two notches need not extend perpendicularly to the longitudinal axis or in parallel to each other in a geometrically precise manner, but may also be divergent from each other. However, in this case, a correspondingly more complex tool design or tool guidance may be required for deforming the area interposed between the notches so as to produce the tab by deformation.

In another exemplary arrangement, the tab is gill-shaped, the tab comprising two semidome-shaped elevations, wherein the connecting device formed at the second end of the diffusor includes a taper. The elevations are disposed such that the first outflow opening directed to the first end and the second outflow opening directed to the second end are formed. The elevation at the respective outflow opening may have the largest (radial) distance from the longitudinal axis. A boundary surface of the two elevations has the smallest radial distance from the longitudinal axis that is larger than or equal to the radius of the tubular base body. The taper at the second end of the diffusor may be produced in a form of a peripheral groove or channel by roller-burnishing or crimping, for example, and thus can act as a virtually pre-formed connecting device for a gas generator which includes a geometrically complementary recess at an intended connecting point to the diffusor so that both recesses, viz. of the diffusor and of the gas generator, can engage positively and/or non-positively in each other. However, it is also imaginable that, in an appropriate mounting step for connecting the diffusor to the gas generator, a corresponding recess is arranged at the diffusor only after the latter is connected to or positioned on the gas generator. In this case, the diffusor thus has, prior to being mounted to the gas generator, an initially cylindrical outer contour at its second end and is brought into a connecting position relative to the gas generator which has a peripheral recess in its outer housing. Then the diffusor is formed with its connecting point onto or into the gas generator, such as by roller-burnishing or crimping, so that an appropriate complementary recess is formed at the diffusor as late as by this mounting step.

In another exemplary arrangement, a curvature of the elevations slopes toward the first and second outflow openings so that a radial proportion of flow of the gas out of the interior of the diffusor can be reduced by the first and second outflow openings and the flow can be substantially formed to be exclusively axial. This means that the elevation at a region spaced apart from the first and, resp., second outflow openings shows the largest (radial) distance from the longitudinal axis. In other words, the curvature in the axial direction effectuates sort of a gas directing portion that directs the flow of the gas slightly radially inwards, at least such that radially outwardly directed flow portions which might form are directed at the outflow openings basically exclusively to an axial line at least in such a way that in general a substantially exclusively axial direction is resulting for the flow of the gas.

In an alternative arrangement, the first outflow opening is formed by a first tab and the second outflow opening is formed by a second tab, the first and second tabs being formed by two parallel notches extending perpendicularly to the longitudinal axis and deforming a part of the region directed from each of the notches to a first and, resp., second end in a radially inward direction. This exemplary arrangement is inverse to the arrangement described in the foregoing, insofar as the base body of the diffusor is deformed inwardly rather than outwardly. The first and second tabs are gill-shaped, wherein each of the first and second tabs comprises a semidome-shaped recess.

In the afore-mentioned exemplary arrangements, the tab or the first and second tabs is/are usefully formed symmetrically with respect to the longitudinal axis and/or a transverse axis.

In one exemplary arrangement, the first outflow opening that is directed toward the first end has a larger opening area than the second outflow opening that is directed toward the second end. In particular, the opening area of the first and second openings is designed so that a mass flow of the gas through the first opening is equal to the mass flow through the second opening. The diffusor can be used in a shear-neutral manner thanks to the opposite equal mass flows.

In one exemplary arrangement, the base body has an inwardly directed bottom curvature on a side radially opposite to the first and second outflow openings. The bottom curvature optimizes the orientation of the main flow inside the diffusor with respect to the outflow openings.

In another exemplary arrangement, two or more first and second outflow openings are disposed, in particular distributed, in a circumferential direction. By disposing further first and second outflow openings, the gas flow is distributed better in the airbag and, resp., it is possible to fill several airbags separately from each other.

One independent aspect of the disclosure relates to a gas generator, in particular a tubular gas generator, for an airbag module comprising a tubular housing and a diffusor according to the disclosure that is arranged at a first end of the gas generator.

Appropriately, a diameter of the gas generator and a diameter of the diffusor are substantially equal.

In one exemplary arrangement, the housing of the gas generator includes a taper at its first end in which a/the taper of the diffusor can engage complementarily or can be formed. As described in the foregoing already, the diffusor can be fixed to the housing of the gas generator by appropriate crimping or peripheral roller-burnishing, wherein the taper can be introduced to the diffusor already prior to mounting by fixation or only afterwards and, resp., by the corresponding mounting step.

The gas generator may be a pyrotechnical gas generator or a hybrid gas generator comprising a compressed gas tank filled with compressed gas.

Another independent aspect of the disclosure relates to an airbag comprising a gas generator, an airbag that can be inflated by the gas generator and a fastening device for attaching the airbag module to a vehicle. The gas generator may be designed as described above.

Furthermore, within the scope of the present application, a vehicle safety system, in particular for protecting a person such as a vehicle occupant or a pedestrian, is disclosed and claimed. The vehicle safety system includes a gas generator, an airbag inflatable by the same as part of an airbag module, and an electronic control unit by which the gas generator can be activated when a trigger situation is given. The gas generator is designed as described above.

Another independent aspect of the disclosure relates to a method for manufacturing a diffusor comprising the following steps of:
a) providing a tubular base body having an outer wall and having a baffle cap axially connected to the base body which forms a first end of the diffusor,
b) introducing two parallel notches extending in the radial direction to an outer wall of the base body and having a first length, wherein the notches have a depth of the wall of the base body,
c) plastically deforming, in particular bulging one single tab or first and second tabs in a region or regions adjacent to the notches.

The method according to the disclosure is simple and inexpensive.

In one exemplary configuration of the method, the plastic deformation is carried out either from an interior of the diffusor radially outwards by employing a mandrel comprising one or two semidome-shaped bulge(s) or from the exterior of the diffusor radially inwards by application of an impressing tool comprising one or two semidome-shaped bulge(s).

BRIEF DESCRIPTION OF DRAWINGS

In the following, the disclosure shall be illustrated in detail by the exemplary arrangements with reference to the attached Figures, wherein:

FIG. 1 shows a tubular gas generator comprising a diffusor according to the disclosure in a first configuration;

FIG. 2 shows a longitudinal section of the tubular gas generator according to FIG. 1;

FIG. 3 shows a magnified cutout of FIG. 2;

FIG. 4 shows a diffusor according to the disclosure in the first exemplary configuration;

FIG. 5 shows a longitudinal section of the diffusor according to FIG. 4;

FIG. 6 shows a longitudinal section of a diffusor according to the disclosure in a second exemplary configuration;

FIG. 7 shows a diffusor according to the disclosure in a third exemplary configuration;

FIG. 8 shows a longitudinal section of the diffusor according to FIG. 7;

FIG. 9 shows a longitudinal section of a diffusor according to the disclosure in a fourth exemplary configuration;

FIG. 10 shows a longitudinal section of a diffusor according to the disclosure in a fifth exemplary configuration;

FIG. 11 shows a diffusor according to the disclosure in a sixth exemplary configuration; and FIG. 12 shows a longitudinal section of the diffusor according to FIG. 11.

DETAILED DESCRIPTION

FIGS. 1 to 3 illustrate a gas generator 50 comprising a diffusor 10 according to the disclosure as set forth in a first configuration. FIGS. 4 and 5 show only the diffusor 10 of the first exemplary configuration. The gas generator 50 is configured as a tubular gas generator. The gas generator has a tubular housing 51 with a longitudinal axis 56 at the second end of which an igniter housing 53 including an igniter 52 is arranged. A diaphragm 55 may be arranged in an area of a taper of the housing 5. Another diaphragm 54 may be arranged in an area of a first end of the housing 51. The diffusor 10 includes a tubular base body 11 with a longitudinal axis 16 extending in extension of the longitudinal axis 56 of the housing 51 of the gas generator 50. A baffle cap 12 is connected, axially adjacent to the tubular base body 11, to a first end 13 of the diffusor 10. The tubular base body 11 of the diffusor 10 has a substantially cylindrical outer contour. In addition, the baffle cap 12 axially connected to the base body 11 is to be understood such that the baffle cap 12 is adjacent in the axial direction, i.e., along and, resp., in parallel to the longitudinal axis 16 of the base body 11, to the latter, either as an independent component part or formed integrally with the base body. In the case of an independent component part, the baffle cap 12 may be screwed, crimped, roller-burnished, or adhesively connected, such as by laser or friction welding, to the base body 11, for example. The housing 51 of the gas generator 50 and the tubular base body 11 of the diffusor 10 expediently have a similar, particularly equal, diameter. The diffusor 10 is connected to the housing 51 by crimping or radially circumferential roller-burnishing, for example.

In a region of the tubular base body 11 of the diffusor 10, a tab 20 having two elevations 23 is visible. A first outflow opening 21 and a second outflow opening 22 through which gas can flow out or flow off from the interior of a diffusor 10 into an outer region of the diffusor 10 are disposed between the elevations 23 and the tubular base body 11. As is evident from the longitudinal section in FIG. 2, each of the surface areas of the first outflow opening 21 and the second outflow opening 22 has a surface normal in parallel to the longitudinal axis 16 of the diffusor 10. In a region of the wall of the diffusor 10 substantially opposed to the tab 20, a bottom curvature 24 is disposed in the wall of the diffusor 10.

The operating mode of the gas generator 50 is as follows: When the igniter 52 is ignited or activated, in an interior of the gas generator, gas is generated and/or released so that a corresponding gas flow is generated or forms which moves or is directed along the longitudinal axis 56 of the tubular housing 51 of the gas generator 50 and bursts or opens the diaphragm 55 and, after that, the diaphragm 54. Then the gas flow or the entire amount of gas comprised by the gas flow flows into the diffusor 10 and, resp., is forwarded there. In the diffusor 10, part of the gas or of the gas flow is deflected by the bottom curvature 24 and the baffle cap 12 and, thus, is guided to the second outflow opening 22, thus causing part of the gas flow or part of the amount of gas to leave the outflow opening 22 largely in parallel to the longitudinal axis 56 of the gas generator and, resp., largely in parallel to the longitudinal axis 16 of the base body 11 of the diffusor 10. Another part of the gas flow is guided, after the gas flowing into the diffusor 10, directly through the elevation 23 to the first outflow opening 21 and leaves the diffusor 10 largely in parallel to the longitudinal axis 16. The gas flows which leave the diffusor 10 through the first outflow opening 21 and the second outflow opening 22 extend substantially in opposite directions so that an intended shearing neutrality is maintained for the gas generator 50 with respect to its gas outflow when it is activated.

The diffusor 10 shown in FIGS. 4 and 5 is manufactured from a tubular base body 11 comprising a baffle cap 12 integrally connected to the base body 11 by providing the base body 11 initially with two parallel notches extending perpendicularly to the longitudinal axis 16. In so doing, the base body 11 is cut continuously from outside over its entire wall thickness along an appropriate radially circumferentially extending region. Such cutting which produces the respective notches can be carried out by known material abrasion methods such as sawing, cutting, milling or laser treatment. After that, in the base body 11, a tab 22 having two elevations 23 is formed by a forming tool in the form of a mandrel provided with two semidome-shaped bulges, by the mandrel being appropriately pressed or moved outwards. As an option, a complementarily shaped counter-holding tool can be positioned or guided from outside. Said plastic forming of the tab 22 helps appropriately stretch, expand or also work-harden the material of the diffusor in or at the adjacent region of forming. Further, the diffusor 10 may be provided with a peripheral taper 15 in the region of its second end 14 and/or with a bottom curvature 24 in the region of its first end 13 which is arranged on a side opposite to the tab 20. The diffusor 10 thus can be attached with its peripheral taper 15 onto or to the gas generator 50 for further fastening thereto so that its taper 15 engages in and/or is fixed to a taper or recess of the gas generator 50 appropriately geometrically formed to be complementary in the fastening region with the diffusor 10.

As an alternative to this, however, the peripheral taper 15 of the diffusor 10 can be introduced to the latter only when the diffusor 10 is mounted or fastened to the gas generator 50. Accordingly, before being mounted, the diffusor 10 has a substantially cylindrically shaped second end 14 without a taper and is then positioned, in an appropriate axial fastening position, on the gas generator 10 which includes a corresponding complementary recess. Only then is the diffusor 10 formed onto the complementary recess of the gas generator 50 at its second end 14 in a radially inward direction, for example by radially peripheral roller-burnishing, so that the recess 15 is formed on the diffusor 10.

FIG. 6 illustrates a longitudinal section of a diffusor 10 according to a second exemplary configuration. Deviating from the longitudinal section of a diffusor 10 according to the first exemplary configuration shown in FIG. 5, the elevations 23 are provided with first and second flow directing areas 33, 34. The flow directing area 33 is formed to slope toward the first end 13, while the flow directing area 34 is configured to slope toward the second end 14. In this way, a respective outwardly sloping curvature is formed which prevents a flow component of the gas flowing out of the diffusor from forming with a radial component when it flows out of the first outflow opening 21 and the second outflow opening 22. In other words, gas flowing out of the diffusor that might have a small radially directed outflow component is virtually "forced" by the flow directing areas 33, 34 to continue flowing in an outflow direction substantially exclusively in parallel to the longitudinal axis 16 of the diffusor.

FIGS. 7 and 8 illustrate a diffusor 10 according to a third exemplary configuration. The diffusor 10 has a tubular base body 11 with a longitudinal axis 16. The diffusor 10 includes a tab 20 in a portion of the base body 11. The tab 20 has a larger radial distance from the longitudinal axis 16 than the remaining base body 11 so that a first outflow opening 21 and a second outflow opening 22 are formed. In a longitudinal section, a wall of the tab 20 is parallel to the longitudinal axis 16. Each of the surface areas of the first outflow opening 21 and the second outflow opening 22 has a surface normal in parallel to the longitudinal axis 16. The diffusor 10 may include a bottom curvature 24 also according to the third exemplary configuration. In the area of the second end 14 of the diffusor 10, the diffusor 10 may optionally include a taper 15 for fastening to the gas generator 50.

A fourth exemplary configuration of a diffusor 10 shown in FIG. 9 is a modification of the third exemplary configuration. In the area of the first outflow opening 21 and the second outflow opening 22, the tab 20 includes flow directing areas 33 and 34. In this case, too, the flow directing areas 33 and 34 serve for delimiting a radial flow component and, resp., producing a substantially exclusively parallel outflow direction of a gas out of the interior of the diffusor 10.

In FIG. 10, a diffusor 10 according to a fifth exemplary configuration is shown. The fifth exemplary configuration is another modification of the third exemplary configuration shown in FIGS. 7 and 8. In the fifth exemplary configuration, it is visible in the longitudinal section that the tab 20 has an inclination or an angle with respect to the longitudinal axis 16. The inclination of the tab 20 is selected so that the second outflow opening 22 has a smaller opening area than the first outflow opening 21. The smaller opening area of the second outflow opening 22 can help reduce a mass flow of gas exiting through the second outflow opening 22. Thus, the mass flows can be set as desired, in particular to be equal, through the first outflow opening 21 and the second outflow opening 22 by selecting the inclination of the tab 20.

FIGS. 11 and 12 illustrate a diffusor 10 according to a sixth exemplary configuration. In the sixth exemplary configuration, the diffusor 10 has a tubular base body 11 comprising a baffle cap 12 at a first end 13 of the diffusor 10. In the base body 11, a first tab 20a and a second tab 20b are arranged or configured. The first tab 20a and the second tab 20b have a smaller distance from the longitudinal axis 16 than the remaining base body 11, i.e., they extend inwards. Each of the first and second tabs 20a, b has a semidome-shaped recess 25. A region of the tubular base body 11 is arranged between the ends of the first tab and the second tab 20a, b. A first outflow opening 21 is arranged between an end of the first tab 20a and the region of the tubular base body 11, a second outflow opening 22 is arranged between an end of the second tab 20b and the region of the tubular base body 11. The outflow openings 21 and 22 show a surface normal in parallel to the longitudinal axis 16.

A diffusor 10 according to the sixth exemplary configuration is manufactured by providing a tubular base body 11 comprising a baffle cap 12. Two parallel notches are introduced to the base body 11 perpendicularly to the longitudinal axis 16 of the base body 11. Regions located outside of each of the parallel notches introduced are impressed radially inwardly by a forming tool so that a first tab 20a and a second tab 20b are produced. The region between the two tabs 20a, b is not deformed so that here a region of the base body 11 is practically maintained or retained as a remainder which, when viewed per se, takes the shape of an arc or a cutout of an arc. The outer wall of the base body 11 in this exemplary arrangement of the diffusor includes, when viewed per se or viewed without the afore-mentioned formed arc, merely one single opening to the outside or one single outflow opening which is correspondingly slit-shaped along a region of the circumference of the base body 11. If the tubular base body 11 is viewed concerning the option of different gas flow paths or gas flow directions and, accordingly, in particular the afore-mentioned formed arc is also viewed, however, the single outflow opening can be regarded as a configuration of the afore-mentioned first and second outflow openings 21, 22.

The invention claimed is:

1. A diffusor for a gas generator of an airbag module, comprising a substantially tubular base body with a longitudinal axis, a baffle cap axially connected to the base body at a first end of the diffusor and a second end of the diffusor opposite to the first end,
   wherein in an outer wall of the tubular base body, first and second outflow openings are formed such that gas can flow out of an interior of the diffusor substantially in parallel to the longitudinal axis toward the first and second ends from the diffusor, the baffle cap being free from the first and second outflow openings;
   wherein the first outflow opening and the second outflow opening are formed by one single tab which is formed by two parallel notches extending perpendicularly to the longitudinal axis in the outer wall of the tubular base body and by deforming a region therebetween in a radially outward direction, wherein the tab comprises two semidome-shaped elevations.

2. The diffusor according to claim 1,
   wherein the baffle cap is configured to be dome-shaped.

3. The diffusor according to claim 1, wherein a connecting device configured at the second end of the diffusor includes a taper.

4. The diffusor according to claim 3,
   wherein a curvature of each of the elevations slopes toward the respective first and second outflow openings so that a radial proportion of a flow of the gas out of the interior of the diffusor can be reduced by the first outflow opening and the second outflow opening, and the flow can be substantially formed to be exclusively axial.

5. The diffusor according to claim 4, wherein the tab is formed to be symmetrical with respect to the longitudinal axis and/or a transverse axis.

6. The diffusor according to claim 4, wherein the base body includes an inwardly directed bottom curvature on a side radially opposed to the first and second outflow openings.

7. The diffusor according to claim 1,
   wherein the tab is formed to be symmetrical with respect to the longitudinal axis and/or a transverse axis.

8. The diffusor according to claim 1,
   wherein the first outflow opening which is directed toward the first end has a larger opening area than the second outflow opening which is directed toward the second end, wherein the opening area of the first and second outflow openings is designed so that a mass flow of the gas through the first outflow opening is substantially equal to the mass flow of gas through the second outflow opening.

9. The diffusor according to claim 1,
   wherein the base body includes an inwardly directed bottom curvature on a side radially opposed to the first and second outflow openings.

10. The diffusor according to claim 1,
    wherein two or more first and second outflow openings are distributed in a circumferential direction.

11. A gas generator for an airbag module comprising a tubular housing and a diffusor according to claim 1, which is arranged at a first end of the gas generator.

12. The gas generator according to claim 11,
    wherein the housing of the gas generator includes at its first end a taper in which a taper of the diffusor can engage in a complementary manner.

13. The gas generator according to claim 11,
    wherein a diameter of the gas generator and a diameter of the diffusor are substantially equal and/or the gas generator is a pyrotechnic gas generator or a hybrid gas generator.

14. An airbag module comprising a gas generator, an airbag inflatable by the gas generator and a fastening device for attaching the airbag module to a vehicle,
    wherein the gas generator is configured according to claim 11.

15. A vehicle safety system, comprising a gas generator, an airbag inflatable by a same as part of an airbag module, and an electronic control unit by which the gas generator can be activated when a release situation is given,
    wherein the gas generator is configured according to claim 11.

16. A method for manufacturing a diffusor comprising the following steps of:
    a. providing a tubular base body including an outer wall and including a baffle cap axially connected to the base body which forms a first end of the diffusor,
    b. introducing two parallel notches extending in a radial direction to an outer wall of the base body and having a first length, wherein the notches have a depth of the wall of the base body,
    c. plastically deforming, a first tab and a second tab in a region or regions adjacent to the notches in a radially outward direction, wherein the plastically deforming step creates two semidome-shaped elevations.

17. The method according to claim 16,
    wherein the plastic deformation is carried out either from an interior of the diffusor to radially outside by a mandrel having two semidome-shaped bulges or from an exterior of the diffusor to radially inside by application of an impressing tool having two semidome-shaped bulges.

* * * * *